US012707342B2

(12) United States Patent
Zhu et al.

(10) Patent No.: US 12,707,342 B2
(45) Date of Patent: Aug. 11, 2026

(54) METHOD AND APPARATUS FOR INDIRECT DATA FORWARDING

(71) Applicant: Telefonaktiebolaget LM Ericsson (publ), Stockholm (SE)

(72) Inventors: Ting Zhu, Shanghai (CN); Yunjie Lu, Shanghai (CN); Deqin Zhan, Shanghai (CN); Wu Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 546 days.

(21) Appl. No.: 17/918,247

(22) PCT Filed: Apr. 23, 2021

(86) PCT No.: PCT/CN2021/089262
§ 371 (c)(1),
(2) Date: Oct. 11, 2022

(87) PCT Pub. No.: WO2021/218805
PCT Pub. Date: Nov. 4, 2021

(65) Prior Publication Data

US 2023/0147272 A1 May 11, 2023

(30) Foreign Application Priority Data

Apr. 26, 2020 (WO) ................ PCT/CN2020/086957

(51) Int. Cl.
*H04W 36/00* (2009.01)
*H04W 36/14* (2009.01)

(52) U.S. Cl.
CPC ....... *H04W 36/0022* (2013.01); *H04W 36/14* (2013.01)

(58) Field of Classification Search
None
See application file for complete search history.

(56) References Cited

U.S. PATENT DOCUMENTS 10,200,917 B2 * 2/2019 Kurokawa ............ H04W 40/22
11,109,263 B2 8/2021 Han et al.
(Continued)

FOREIGN PATENT DOCUMENTS

AU 2018399714 A1 7/2020
CN 108282832 A 7/2018
CN 109391932 A 2/2019
CO 2022016243 A2 11/2022
(Continued)

OTHER PUBLICATIONS

China Mobile, "3GPP TSG-SA WG2 Meeting #125" (Year: 2018).*
(Continued)

*Primary Examiner* — Gregory B Sefcheck
*Assistant Examiner* — Benjamin Peter Welte
(74) *Attorney, Agent, or Firm* — Murphy, Bilak & Homiller, PLLC

(57) ABSTRACT

Embodiments of the present disclosure provide methods and apparatus for indirect data forwarding. A method at a mobility management node comprises sending, to a serving gateway entity in the first system, a request for creating an indirect data forwarding tunnel. The request comprises an indication flag for indicating to the serving gateway entity that an indirect data forwarding tunnel is to be created with a user plane function entity in a second system. The method further comprises receiving a response for the request from the serving gateway entity.

12 Claims, 10 Drawing Sheets

900

902

Sending, to a serving gateway entity, a request for creating an indirect data forwarding tunnel, wherein the request comprises an indication flag for indicating the serving gateway entity that the indirect data forwarding is related to a user plane function entity

904

Receiving a response for the request from the serving gateway entity

(56) References Cited

U.S. PATENT DOCUMENTS

| | | | | |
|---|---|---|---|---|
| 11,463,929 | B2 * | 10/2022 | Kim | H04W 36/0022 |
| 11,627,628 | B2 | 4/2023 | Li et al. | |
| 11,871,291 | B2 * | 1/2024 | Shan | H04W 76/12 |
| 2013/0128864 | A1 | 5/2013 | Kim | |
| 2014/0169271 | A1 | 6/2014 | Awano et al. | |
| 2018/0220479 | A1 * | 8/2018 | Shu | H04W 88/16 |
| 2020/0112866 | A1 | 4/2020 | Liu | |
| 2020/0383151 | A1 * | 12/2020 | Wang | H04W 36/0066 |
| 2022/0141905 | A1 * | 5/2022 | Gan | H04W 88/06 |
| 2023/0164659 | A1 * | 5/2023 | Abtin | H04W 36/0022 |

FOREIGN PATENT DOCUMENTS

| | | | |
|---|---|---|---|
| CO | 2022015989 | A2 | 2/2023 |
| WO | 2015065701 | A1 | 5/2015 |
| WO | 2018128494 | A1 | 7/2018 |
| WO | 2019027742 | A1 | 2/2019 |
| WO | 2019134295 | A1 | 7/2019 |
| WO | 2020034950 | A1 | 2/2020 |

OTHER PUBLICATIONS

"3GPP TS 29.274 V16.3.0", 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16), Mar. 2020, pp. 1-392.

"TS 23.502: Corrections on indirect data forwarding", SA WG2 Meeting #124, S2-178773, Reno, USA, Nov. 27-Dec. 1, 2017, pp. 1-7.

"3GPP TS 23.401 V16.5.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Dec. 2019, pp. 1-436.

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

"3GPP TS 23.502 V16.4.0", 3rd Generation Partnership Project; Technical Specification Group Services and System Aspects; Procedures for the 5G System (5GS); Stage 2 (Release 16), Mar. 2020, pp. 1-582.

"3GPP TS 23.214 V16.0.0", 3rd Generation Partnership Project; Technical Specification Group Services and System Aspects; Architecture enhancements for control and user plane separation of EPC nodes; Stage 2 (Release 16), Jun. 2019, pp. 1-92.

* cited by examiner

900

902

Sending, to a serving gateway entity, a request for creating an indirect data forwarding tunnel, wherein the request comprises an indication flag for indicating the serving gateway entity that the indirect data forwarding is related to a user plane function entity

904

Receiving a response for the request from the serving gateway entity

METHOD AND APPARATUS FOR INDIRECT DATA FORWARDING

TECHNICAL FIELD

The non-limiting and exemplary embodiments of the present disclosure generally relate to the technical field of communications, and specifically to methods and apparatuses for indirect data forwarding.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network, various handover procedures may be used to hand over a user equipment (UE) from a source access node such as to a target access node. When data forwarding is used as a part of handover procedure, different routes may be used for example based on a network configuration (e.g. direct or indirect data forwarding). These routes can be between any suitable network entities.

The handover procedure can be an intra system handover procedure or an inter system handover procedure. For example, the inter system handover may be fifth generation system (5GS) to evolved packet system (EPS) handover using N26 interface or EPS to 5GS handover procedure using N26 interface. The handover procedure can be triggered due to various reasons, for example, due to new radio conditions, load balancing or specific service e.g. in the presence of quality of service (QoS) flow for voice, etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems with the existing inter system handover procedures. For example, when the indirect data forwarding applies in the inter system handover procedure such as 5GS to EPS handover procedure or EPS to 5GS handover procedure, it can not correctly work.

To overcome or mitigate the above mentioned problem or other problem(s), the embodiments of the present disclosure propose an improved indirect data forwarding solution.

In a first aspect of the disclosure, there is provided a method at a mobility management node. The mobility management node comprises sending, to a serving gateway entity in the first system, a request for creating an indirect data forwarding tunnel. The request comprises an indication flag for indicating to the serving gateway entity that an indirect data forwarding tunnel is to be created with a user plane function entity in a second system. The method further comprises receiving a response for the request from the serving gateway entity.

In an embodiment, the first system is evolved packet system (EPS). The second system is fifth generation system (5GS).

In an embodiment, the request may be sent during an inter system handover.

In an embodiment, the inter system handover may be one of fifth generation system, 5GS, to evolved packet system, EPS, handover, using N26 interface or EPS to 5GS handover using N26 interface.

In an embodiment, the indirect data forwarding being related to the user plane function entity may comprise one of the indirect data forwarding from the user plane function entity to a user plane of the serving gateway entity for fifth generation system, 5GS, to evolved packet system, EPS, handover using N26 interface; or the indirect data forwarding from the user plane of the serving gateway entity to the user plane function entity for EPS to 5GS handover using N26 interface.

In an embodiment, the indication flag may be set to 1 if the indirect data forwarding is required for at least one user plane route from the user plane function entity in fifth generation system, 5GS, to evolved packet system, EPS, handover using N26 interface or to the user plane function entity in the EPS to 5GS handover using N26 interface; and In an embodiment, the indication flag may not be set to 1 or is absent if the indirect data forwarding is used for other mobility procedures in addition to the EPS to 5GS handover using N26 interface and the 5GS to EPS handover using N26 interface.

In an embodiment, the request may be a Create Indirect Data Forwarding Tunnel Request and the response for the request may be a Create Indirect Data Forwarding Tunnel Response.

In an embodiment, the mobility management node may be a mobility management entity, MME.

In an embodiment, the serving gateway entity may be a serving gateway, SGW, or a SGW control plane, SGW-C.

In an embodiment, the user plane function entity may be a User plane Function (UPF).

In a second aspect of the disclosure, there is provided a method at a serving gateway entity. The method comprises receiving, from a mobility management node in the first system, a request for creating an indirect data forwarding tunnel. The request comprises an indication flag for indicating to the serving gateway entity that an indirect data forwarding tunnel is to be created with a user plane function entity in a second system. The method further comprises processing the request to generate a response for the request. The method further comprises sending, to the mobility management node, the response for the request.

In an embodiment, the request may be received during an inter system handover.

In a third aspect of the disclosure, there is provided a mobility management node. The mobility management node comprises a processor and a memory coupled to the processor. Said memory contains instructions executable by said processor. Said mobility management node is operative to send, to a serving gateway entity in the first system, a request for creating an indirect data forwarding tunnel. The request comprises an indication flag for indicating to the serving gateway entity that an indirect data forwarding tunnel is to be created with a user plane function entity in a second system. Said mobility management node is further operative to receive a response for the request from the serving gateway entity.

In a fourth aspect of the disclosure, there is provided a serving gateway entity. The serving gateway entity comprises a processor and a memory coupled to the processor. Said memory contains instructions executable by said processor. Said serving gateway entity is operative to receive, from a mobility management node in the first system, a request for creating an indirect data forwarding tunnel. The request comprises an indication flag for indicating the serving gateway entity that the indirect data forwarding is related to a user plane function entity in a second system. Said serving gateway entity is further operative to process the request to generate a response for the request. Said serving gateway entity is further operative to send, to the mobility management node, the response for the request.

In a fifth aspect of the disclosure, there is provided a mobility management node. The mobility management node comprises a sending module and a receiving module. The sending module may be configured to send, to a serving gateway entity in the first system, a request for creating an indirect data forwarding tunnel. The request comprises an indication flag for indicating to the serving gateway entity that an indirect data forwarding tunnel is to be created with a user plane function entity in a second system. The receiving module may be configured to receive a response for the request from the serving gateway entity.

In a sixth aspect of the disclosure, there is provided a serving gateway entity. The serving gateway entity comprises a receiving module, a processing module and a sending module. The receiving module may be configured to receive, from a mobility management node in the first system, a request for creating an indirect data forwarding tunnel. The request comprises an indication flag for indicating the serving gateway entity that the indirect data forwarding is related to a user plane function entity in a second system. The processing module may be configured to process the request to generate a response for the request. The sending module may be configured to send, to the mobility management node, the response for the request.

In a seventh aspect of the disclosure, there is provided a computer program product comprising instructions which, when executed on at least one processor, cause the at least one processor to carry out the method according to any of the first and second aspects of the disclosure.

In an eighth aspect of the disclosure, there is provided a computer-readable storage medium storing instructions which, when executed on at least one processor, cause the at least one processor to carry out the method according to any of the first and second aspects of the disclosure.

Embodiments herein afford many advantages, of which a non-exhaustive list of examples follows. In some embodiments herein, when the indirect data forwarding applies in the inter system handover procedure such as 5GS to EPS handover procedure or EPS to 5GS handover procedure, it can correctly work. It's possible for downlink data to deliver to eNodeB for 5GS to EPS handover or to NG-RAN for EPS to 5GS handover when Indirect Data Forwarding procedure is applied. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
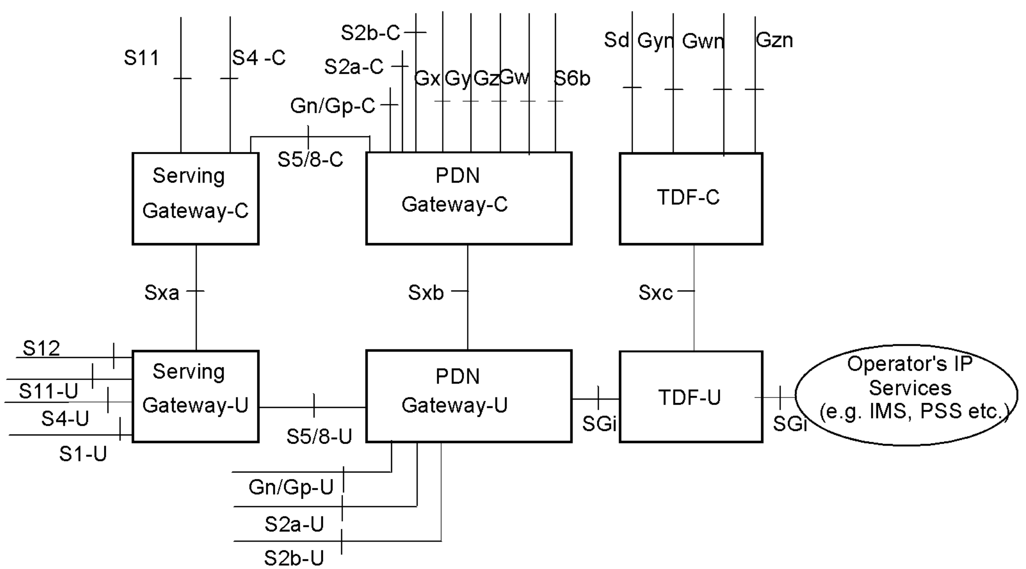
FIG. 1 schematically shows a high level architecture of CUPS in the fourth generation network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless/wired communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by some of standards organizations such as 3GPP (3rd Generation Partnership Project). For example, the communication protocols as defined by 3GPP may comprise the third generation (3G), fourth generation (4G), 4.5G, the fourth generation (5G) communication protocols, and/or any other protocols either currently known or to be developed in the future.

The term "network node" used herein refers to a network device or entity such as a core network device in a communication network. For example, in a wireless communication network such as a 3GPP-type cellular network, the network node may be a control plane function node and/or a user plane function node, which may offer numerous services to customers who are interconnected by an access network device. Each access network device is connectable to the core network device over a wired or wireless connection.

The term "network function (NF)" refers to any suitable function which can be implemented in a network entity (physical or virtual) of a communication network. For example, the 5G system (5GS) may comprise a plurality of NFs such as AMF (Access and Mobility Management Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), etc. In other embodiments, the network function may comprise different types of NFs for example depending on the specific network. The 4G system may comprise a plurality of network entities such as mobility management entity (MME) SGW (serving gateway), PGW (packet data network (PDN) gateway), etc. The architecture of control and user plane separation (CUPS) of various network devices such as SGW, PGW, etc. has been introduced in a communication network. In the architecture of CUPS, various interfaces between the control plane nodes (or functions) and the user plane nodes (or functions) have been defined. For example, an Sxb interface is defined between a PGW control plane (PGW-C) and a PGW user plane (PGW-U) and an Sxa interface is defined between a SGW control plane (SGW-C) and a SGW user plane (SGW-U). An N4 interface is defined between a Session Management Function (SMF) and a User Plane Function (UPF). In some embodiments, the network entity or function with same or similar functions in different networks can be referred to as a combined network entity, for example, PGW-C+SMF (PGW-C combined with SMF), PGW-U+UPF (PGW-U combined with UPF), etc.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks, etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Although the subject matter described herein may be implemented in any appropriate type of system using any suitable components, the embodiments disclosed herein are described in relation to a communication system complied with the exemplary system architectures illustrated in FIGS. 1-5. For simplicity, the system architectures of FIGS. 1-5 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture of CUPS in the fourth generation network according to an embodiment of the present disclosure. The 4G network may be EPC (Evolved Packet Core)/E-UTRAN (Evolved Universal Terrestrial Radio Access Network). The system architecture of FIG. 1 is same as the architecture reference model as described in clause 4.2 of 3GPP TS23.214 V16.0.0, the disclosure of which is incorporated by reference herein in its entirety, and may comprise some exemplary network nodes such as serving gateway-C(SGW-C), serving gateway-U (SGW-U), PDN gateway-C (PGW-C), PDN gateway-U (PGW-U), TDF (traffic detection function) control plane (TDF-C) and TDF user plane (TDF-U). As further illustrated in FIG. 1, the exemplary system architecture also contains some interfaces such as Sxa. Sxb, Sxc, etc. Various network nodes shown in FIG. 1 may be responsible for functions for example as defined in 3GPP TS23.214 V16.0.0, the disclosure of which is incorporated by reference herein in its entirety. Each PGW-C may manage/control one or more PGW-Us though only one PGW-U is shown in the system. Each SGW-C may manage/control multiple SGW-Us though only one SGW-U is shown in the system. Each TDF-C may manage/control multiple TDF-Us though only one TDF-U is shown in the system.

Figure 2:
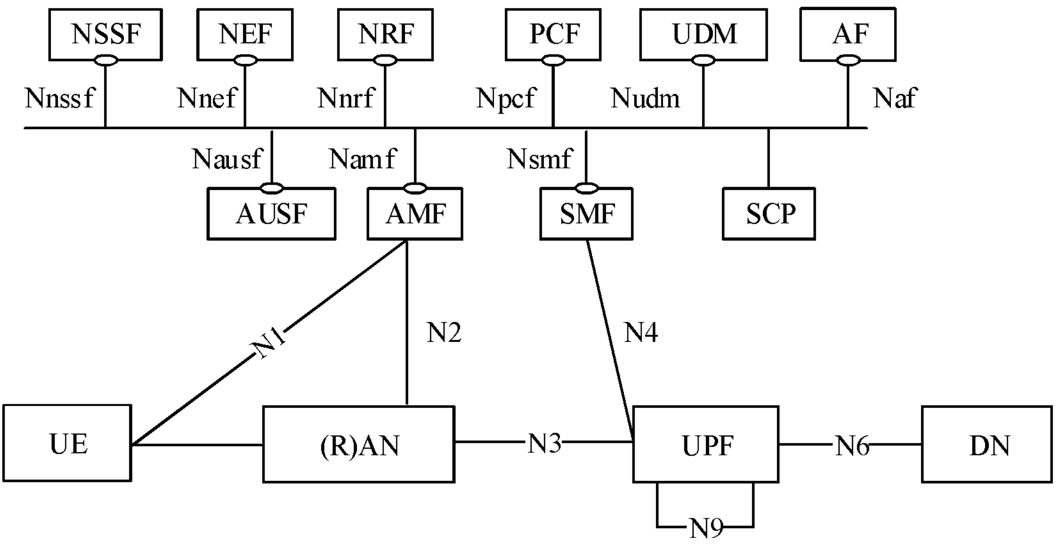
FIG. 2 schematically shows a high level architecture in the fifth generation network according to an embodiment of the present disclosure.

FIG. 2 schematically shows a high level architecture in the fifth generation network according to an embodiment of the present disclosure. For example, the fifth generation network may be 5GS. The architecture of FIG. 2 is same as FIG. 4.2.3-1 as described in 3GPP TS 23.501 V16.4.0, the disclosure of which is incorporated by reference herein in its entirety. The system architecture of FIG. 2 may comprise some exemplary elements such as AUSF, AMF, DN (data network), NEF, NRF, NSSF, PCF, SMF, UDM, UPF, AF, UE, (R)AN, SCP (Service Communication Proxy), etc.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.4.0.

Figure 3:
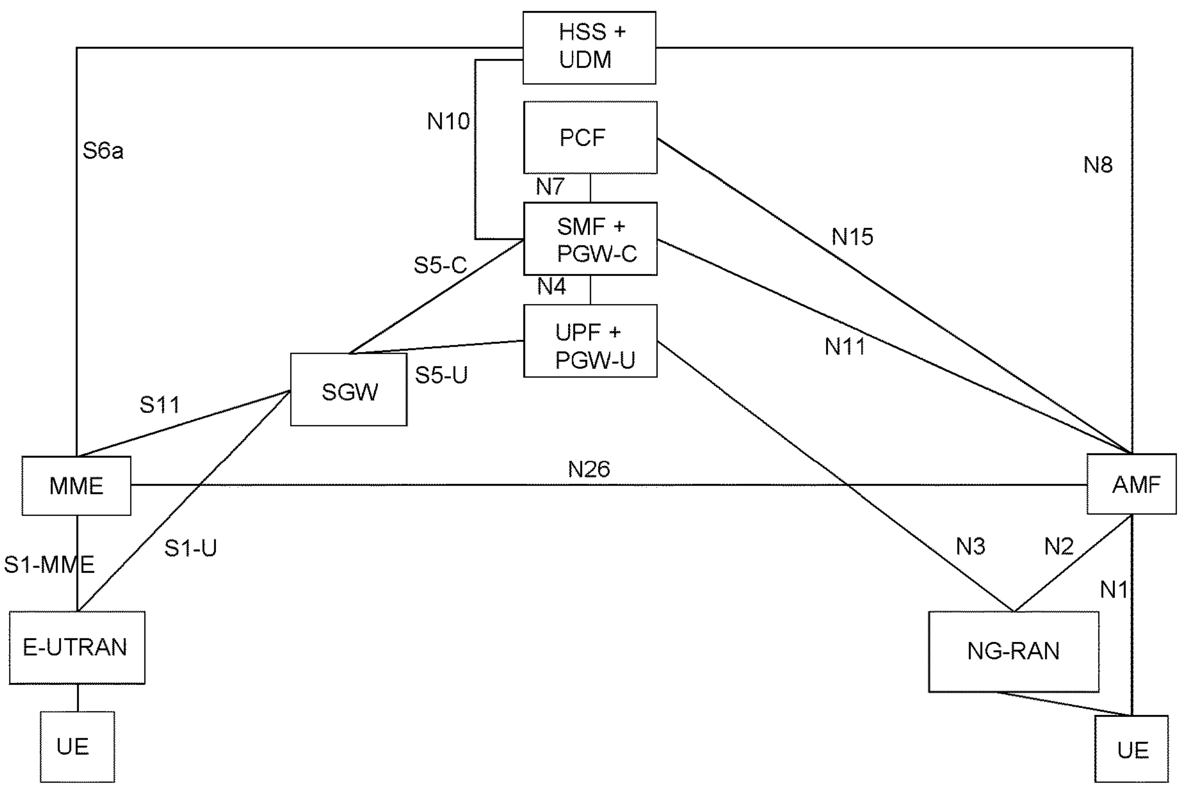
FIG. 3 schematically shows a non-roaming architecture for interworking between 5GS and EPC/E-UTRAN according to an embodiment of the present disclosure.

FIG. 3 schematically shows a non-roaming architecture for interworking between 5GS and EPC (Evolved Packet Core)/E-UTRAN (Evolved Universal Terrestrial Radio Access Network) according to an embodiment of the present disclosure. The architecture for of FIG. 3 is same as FIG. 4.3.3-1 as described in 3GPP TS 23.501 V16.4.0.

As shown in FIG. 3, N26 interface is an inter-CN (core network) interface between the MME and 5GS AMF in order to enable interworking between EPC and the NG core. Support of N26 interface in the network is optional for interworking. N26 supports subset of the functionalities (essential for interworking) that are supported over S10. PGW-C+SMF and UPF+PGW-U are dedicated for interworking between 5GS and EPC, which are optional and are based on UE MM (Mobility Management) Core Network Capability and UE subscription. UEs that are not subject to 5GS and EPC interworking may be served by entities not dedicated for interworking, i.e. by either by PGW or SMF/UPF. There can be another UPF (not shown in the FIG. 3) between the NG-RAN (next generation RAN) and the UPF+PGW-U, i.e. the UPF+PGW-U can support N9 towards an additional UPF, if needed. Figures and procedures in this specification that depict an SGW make no assumption whether the SGW is deployed as a monolithic SGW or as an SGW split into its control-plane and user-plane functionality as described in TS 23.214 V16.0.0.

Figure 4:
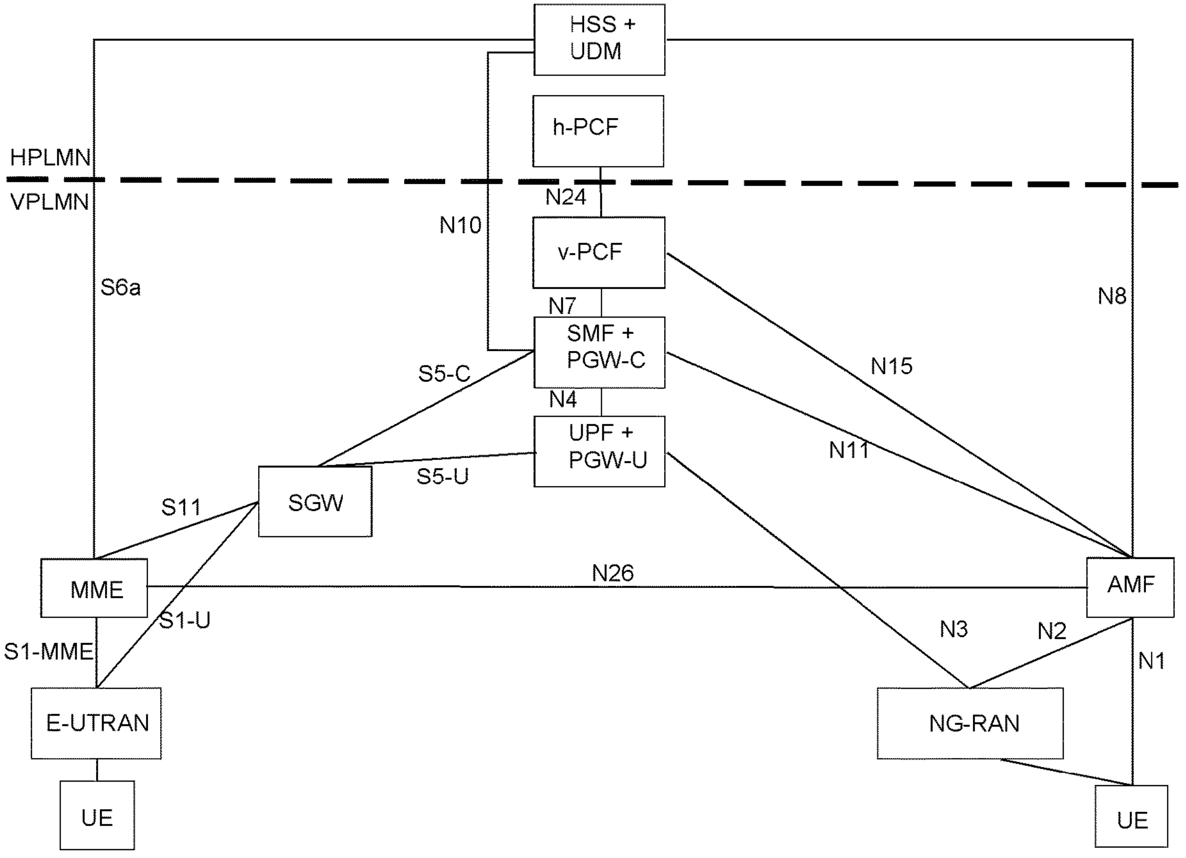
FIG. 4 schematically shows a local breakout roaming architecture for interworking between 5GS and EPC/E-UTRAN.
Figure 5:
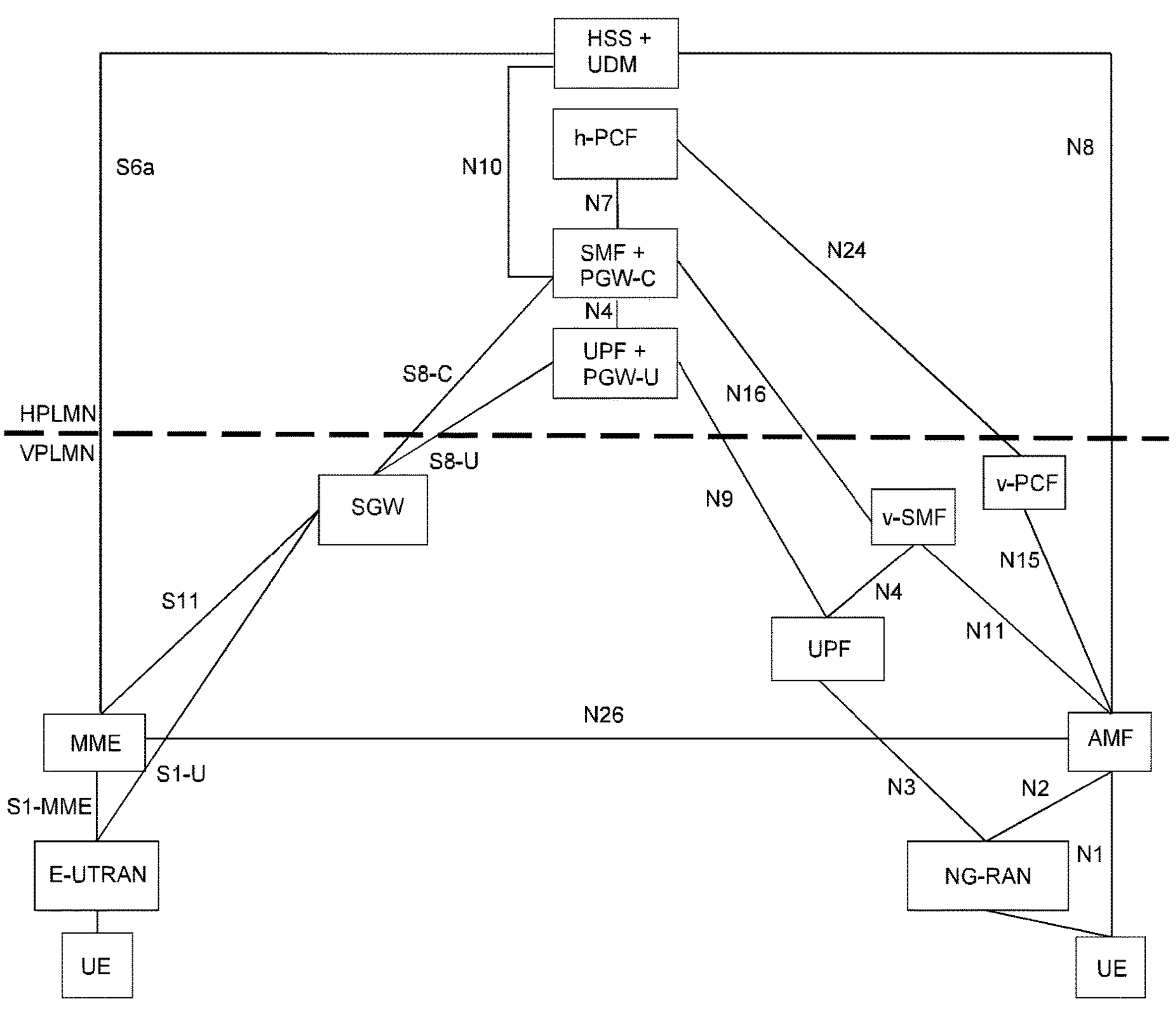
FIG. 5 schematically shows a home-routed roaming architecture for interworking between 5GS and EPC/E-UTRAN.

FIG. 4 schematically shows a local breakout roaming architecture for interworking between 5GS and EPC/E-UTRAN. FIG. 5 schematically shows a home-routed roaming architecture for interworking between 5GS and EPC/E-UTRAN. The architecture of FIG. 4 is same as FIG. 4.3.2-1 as described in 3GPP TS 23.501 V16.4.0. The architecture of FIG. 5 is same as FIG. 4.3.2-2 as described in 3GPP TS 23.501 V16.4.0. As shown in FIG. 4, there can be another UPF (not shown in FIG. 4) between the NG-RAN and the UPF+PGW-U, i.e. the UPF+PGW-U can support N9 towards the additional UPF, if needed. HPLMN denotes Home Public Land Mobile Network. VPLMN denotes Visited Public Land Mobile Network. "h-" denotes Home. "v-" denotes visited CF. HSS denotes Home Subscriber Server.

When data forwarding is used as part of mobility procedures, different user plane routes may be used based on the network configuration (e.g. direct or indirect data forwarding). For example, the indirect data forwarding may be used in an inter system handover procedure from 5GS to EPS or from EPS to 5GS with N26 supported.

Figure 6:
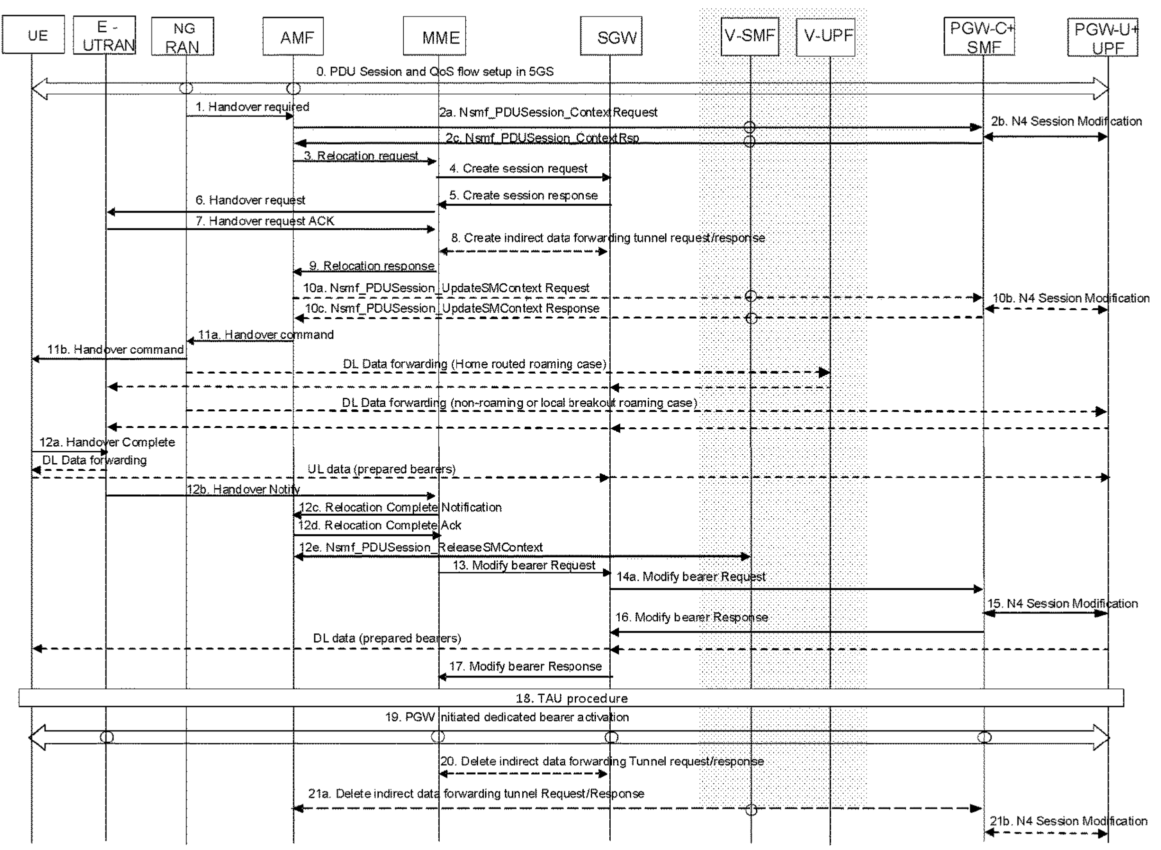
FIG. 6 shows a flowchart of 5GS to EPS handover for single-registration mode with N26 interface according to an embodiment of the present disclosure.

FIG. 6 shows a flowchart of 5GS to EPS handover for single-registration mode with N26 interface according to an embodiment of the present disclosure. FIG. 6 is same as the FIG. 4.11.1.2.1-1 of 3GPP TS 23.502 V16.4.0, the disclosure of which is incorporated by reference herein in its entirety. The detailed description of each step of FIG. 6 has been described in 3GPP TS 23.502 V16.4.0.

As shown in FIG. 6, the source NG-RAN may send a HO (handover) Required message (including Handover Type as 5GStoEPS and Target ID (identifier) of E-UTRAN) to AMF and the AMF determines from the Target eNB Identifier IE (information element) that the type of handover is Handover to E-UTRAN. Then AMF sends a Forward Relocation Request to MME with SGW/UPF F-TEID (Fully Qualified Tunnel Endpoint Identifier) for DL (downlink) data forwarding information.

With respect to 5GS to EPS handover procedure, the network entity sending the Forward Relocation Request to MME can be:

- the source MME that sends the Forward Relocation Request to the target MME over the S10 interface as part of an S1-based handover relocation procedure;
- the source AMF that sends the Forward Relocation Request to the target MME over the N26 interface as part of the 5GS to EPS handover procedures.

For the target MME, it can know the source node is MME or AMF from Sender's F-TEID for Control Plane (for example, 40 may indicate N26 AMF GTP-C interface, while 12 may indicate S10/N26 MME GTP-C (GPRS (General Packet Radio Service) Tunnelling Protocol for User Plane) interface). But when the target MME sends the Indirect Data Forwarding message to SGW-C for indirect data forwarding, MME doesn't transfer this information to the SGW-C. Thus SGW-U can't differentiate downlink data forwarding from UPF or SGW-U and doesn't work since different user plane routes may be used by the SGW-U based on network instance SGW-C provided in Packet Forwarding Control Protocol (PFCP) interaction, e.g. s1-u network instance for source SGW-U, while s5s8-u network instance for source UPF. Therefore, this information may not be obtained by the SGW-C and it's ambiguous for the SGW-C to judge which source (either SGW-U or UPF) is come from for downlink data forwarding.

Figure 7:
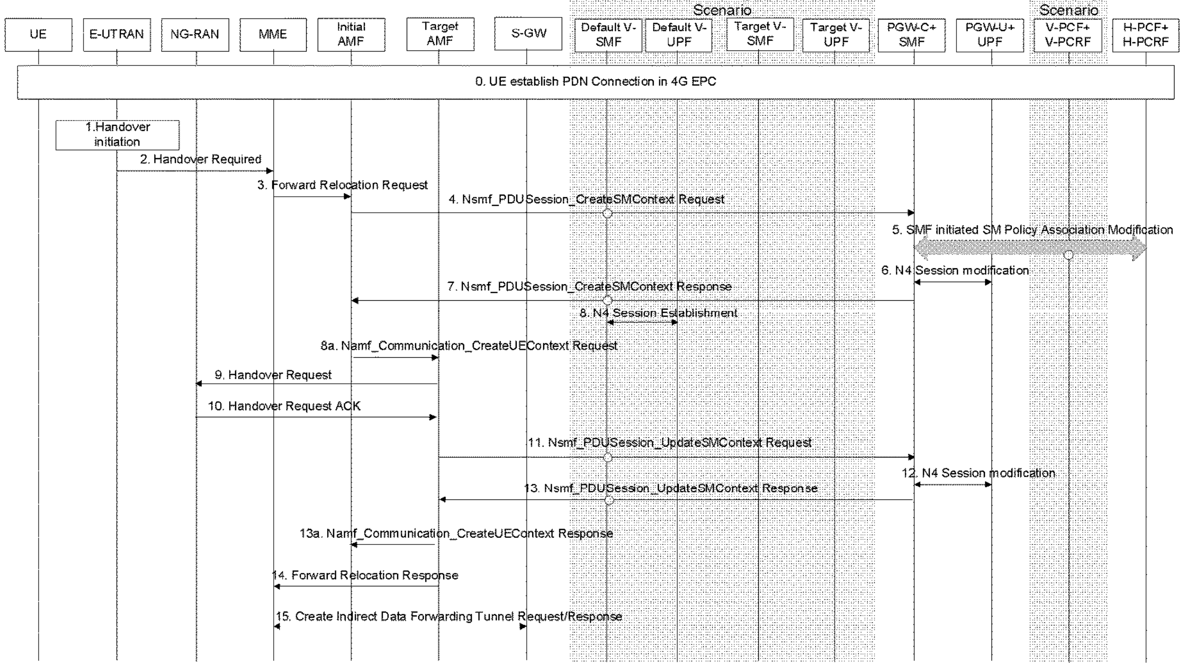
FIG. 7 shows a flowchart of a preparation phase of EPS to 5GS handover using N26 interface according to an embodiment of the present disclosure.

FIG. 7 shows a flowchart of a preparation phase of EPS to 5GS handover using N26 interface according to an embodiment of the present disclosure. FIG. 7 is same as the FIG. 4.11.1.2.2.2-1 of 3GPP TS 23.502 V16.4.0. The detailed description of each step of FIG. 7 has been described in 3GPP TS 23.502 V16.4.0.

Figures 8, 9:
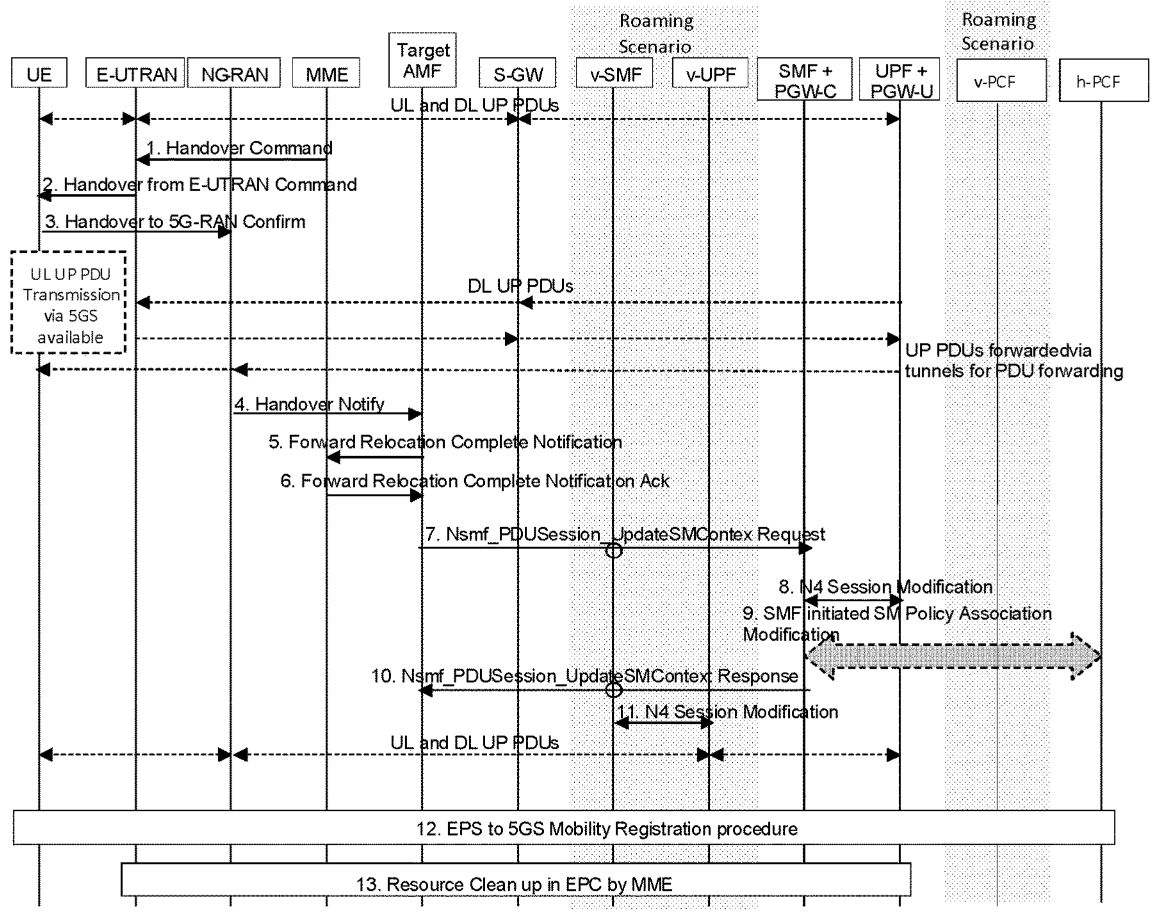
FIG. 8 shows a flowchart of an execution phase of EPS to 5GS handover using N26 interface according to an embodiment of the present disclosure.
FIG. 9 shows a flowchart of a method according to an embodiment of the present disclosure.

FIG. 8 shows a flowchart of an execution phase of EPS to 5GS handover using N26 interface according to an embodiment of the present disclosure. FIG. 8 is same as the FIG. 4.11.1.2.2.3-1 of 3GPP TS 23.502 V16.4.0. The detailed description of each step of FIG. 8 has been described in 3GPP TS 23.502 V16.4.0.

As shown in FIGS. 7-8, the source E-UTRAN may send the HO Required message (including Handover Type as EPSto5GS and Target ID of NG-RAN) to MME and the MME determines from the Target NG-RAN Identifier IE that the type of handover is Handover to NG-RAN. Then MME sends a Forward Relocation Request to AMF with SGW/UPF F-TEID for DL data forwarding information.

With respect to EPS to 5GS handover procedure, the network entity sending the Forward Relocation Request can be:

- the source MME that sends the Forward Relocation Request to the target MME over the S10 interface as part of an S1-Based handover procedure
- the source MME that sends the Forward Relocation Request to the target AMF over the N26 interface as part of the EPS to 5GS handover procedures.

For the source MME, it can know the target node is MME or AMF when indirect data forwarding is applied, but when the source MME sends the Indirect Data Forwarding message to SGW-C for indirect data forwarding, MME doesn't transfer this information to SGW-C. Thus SGW-U can't differentiate downlink data forwarding to UPF or SGW-U and doesn't work since different user plane routes may be used by SGW-U based on network instance SGW-C provided in PFCP interaction, e.g. s1-u network instance to target SGW-U, while s5s8-u network instance to target UPF. Therefore, this information may not be obtained by the SGW-C and it's ambiguous for the SGW-C to judge which target (either SGW-U or UPF) is for downlink data forwarding.

Therefore when the indirect data forwarding applies in the inter system handover procedure such as 5GS to EPS handover procedure or EPS to 5GS handover procedure, it can not correctly work. To overcome or mitigate the above mentioned problem or other problems, the embodiments of the present disclosure propose an improved indirect data forwarding solution.

FIG. 9 shows a flowchart of a method according to an embodiment of the present disclosure, which may be performed by an apparatus implemented in a mobility management node or communicatively coupled to the mobility management node. As such, the apparatus may provide means or modules for accomplishing various parts of the method 900 as well as means or modules for accomplishing other processes in conjunction with other components. The mobility management node may be any suitable node which can implement mobility management function. For example, the mobility management node may be MME.

At block 902, the mobility management node may send, to a serving gateway entity, a request for creating an indirect data forwarding tunnel. The request may comprise an indication flag for indicating the serving gateway entity that the indirect data forwarding is related to a user plane function entity. The serving gateway entity may be SGW or SGW-C or other similar network entity with serving gateway function. The mobility management node may send, to the serving gateway entity, the request for creating the indirect data forwarding tunnel in various scenarios. For example, the request may be sent during an inter system handover.

In an embodiment, the mobility management node may send to a serving gateway entity in a first system, a request for creating an indirect data forwarding tunnel. The request comprises an indication flag for indicating to the serving gateway entity that an indirect data forwarding tunnel is to be created with a user plane function entity in a second system. In an embodiment, the first system is evolved packet system (EPS). The second system is fifth generation system (5GS).

In an embodiment, the inter system handover may be one of 5GS to EPS handover using N26 interface as described in clause 4.11.1.2.1 in 3GPP TS 23.502 V16.4.0 or EPS to 5GS handover using N26 interface as described in clause 4.11.1.2.2 in 3GPP TS 23.502 V16.4. In other embodiments, the inter system handover may be any other suitable inter system handover.

In an embodiment, the indirect data forwarding being related to the user plane function entity may comprise one of:

- the indirect data forwarding from the user plane function entity to a user plane of the serving gateway entity for 5GS to EPS handover using N26 interface; or
- the indirect data forwarding from the user plane of the serving gateway entity to the user plane function entity for EPS to 5GS handover using N26 interface.

The indication flag may take any suitable form such as a bit. For example, the indication flag may be set to 1 if the indirect data forwarding is required for at least one user plane route from the user plane function entity in 5GS to EPS handover using N26 interface or to the user plane function entity in the EPS to 5GS handover using N26 interface. The indication flag may not be set to 1 or may be absent if the indirect data forwarding is used for other mobility procedures in addition to the EPS to 5GS handover using N26 interface and the 5GS to EPS handover using N26 interface.

In an embodiment, the request may be a Create Indirect Data Forwarding Tunnel Request as shown in step 8 of FIG. 6 or step 15 of FIG. 7. In addition, the Create Indirect Data Forwarding Tunnel Request may further include the indication flag for indicating the serving gateway entity that the indirect data forwarding is related to a user plane function entity.

At block 904, the mobility management node may receive a response for the request from the serving gateway entity.

In an embodiment, the response for the request may be a Create Indirect Data Forwarding Tunnel Response.

In an embodiment, as shown in FIG. 6, if indirect data forwarding applies, the MME may set up forwarding parameters by sending Create Indirect Data Forwarding Tunnel Request (target eNodeB addresses, the indication flag and TEIDs for forwarding) to the Serving GW. The Serving GW sends a Create Indirect Data Forwarding Tunnel Response (target Serving GW addresses and TEIDs for forwarding) to the target MME.

In an embodiment, as shown in FIG. 7, if indirect forwarding applies, the MME sends Create Indirect Data Forwarding Tunnel Request (addresses, the indication flag and TEIDs for forwarding) to the Serving GW. The Serving GW responds with a Create Indirect Data Forwarding Tunnel Response (Serving GW addresses and TEIDs for forwarding) message to the MME.

In an embodiment, the mobility management node may be MME.

In an embodiment, the serving gateway entity may be SGW or SGW-C.

In an embodiment, the user plane function entity may be UPF.

Figure 10:
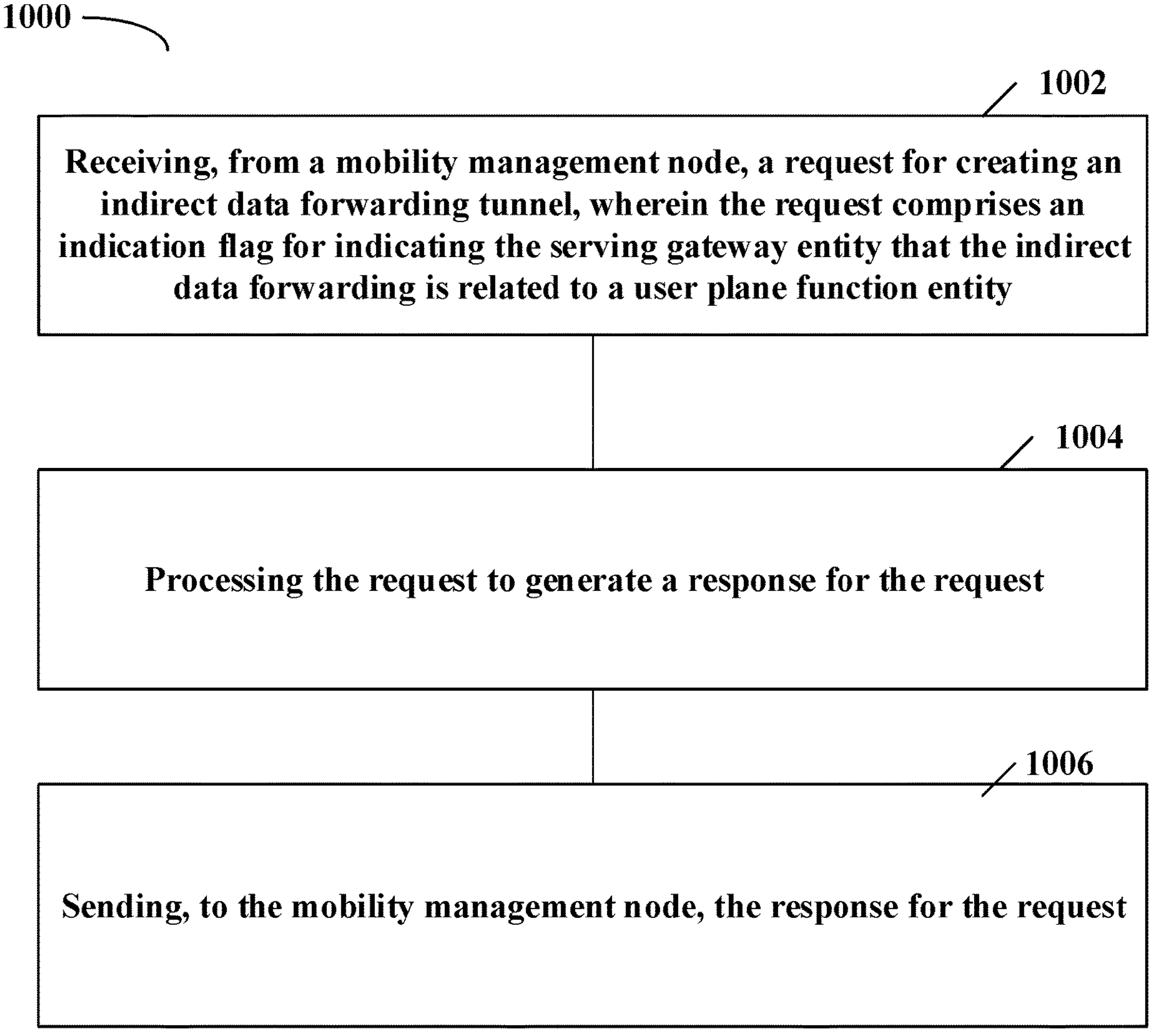
FIG. 10 shows a flowchart of a method according to another embodiment of the present disclosure.

FIG. 10 shows a flowchart of a method according to another embodiment of the present disclosure, which may be performed by an apparatus implemented in a serving gateway entity or communicatively coupled to a serving gateway entity. As such, the apparatus may provide means or modules for accomplishing various parts of the method 1000 as well as means or modules for accomplishing other processes in conjunction with other components. For example, the serving gateway entity may be SGW-C or SGW. For some parts which have been described in the above embodiments, the description thereof is omitted here for brevity.

At block 1002, the serving gateway entity may receive, from a mobility management node, a request for creating an indirect data forwarding tunnel. The request comprises an indication flag for indicating the serving gateway entity that the indirect data forwarding is related to a user plane function entity. For example, the indication flag may indicate SGW that current Indirect Data Forwarding for user plane routes is from UPF to SGW-U for 5GS to EPS interworking procedure or from SGW-U to UPF for EPS to 5GS handover procedure. In an embodiment, the mobility management node may send the request to the serving gateway entity at block 902 of FIG. 9, and then the serving gateway entity may receive this request. In an embodiment, the request may be received during an inter system handover.

In an embodiment, the serving gateway entity may receive from a mobility management node in the first system, a request for creating an indirect data forwarding tunnel. The request comprises an indication flag for indicating to the serving gateway entity that an indirect data forwarding tunnel is to be created with a user plane function entity in a second system. In an embodiment, the first system is evolved packet system (EPS). The second system is fifth generation system (5GS).

At block 1004, the serving gateway entity may process the request to generate a response for the request. The response may include a cause value indicating if the Indirect Data Forwarding Tunnel(s) has been created in the SGW or not. For example, the cause value may be "Request accepted", "Request accepted partially", "Data forwarding not supported" and "Context not found".

For example, a control plane of the serving gateway entity may provide a user plane of the serving gateway entity with packet handling instructions (i.e. PDRs and FARs) for Indirect Data Forwarding.

Figure 11:
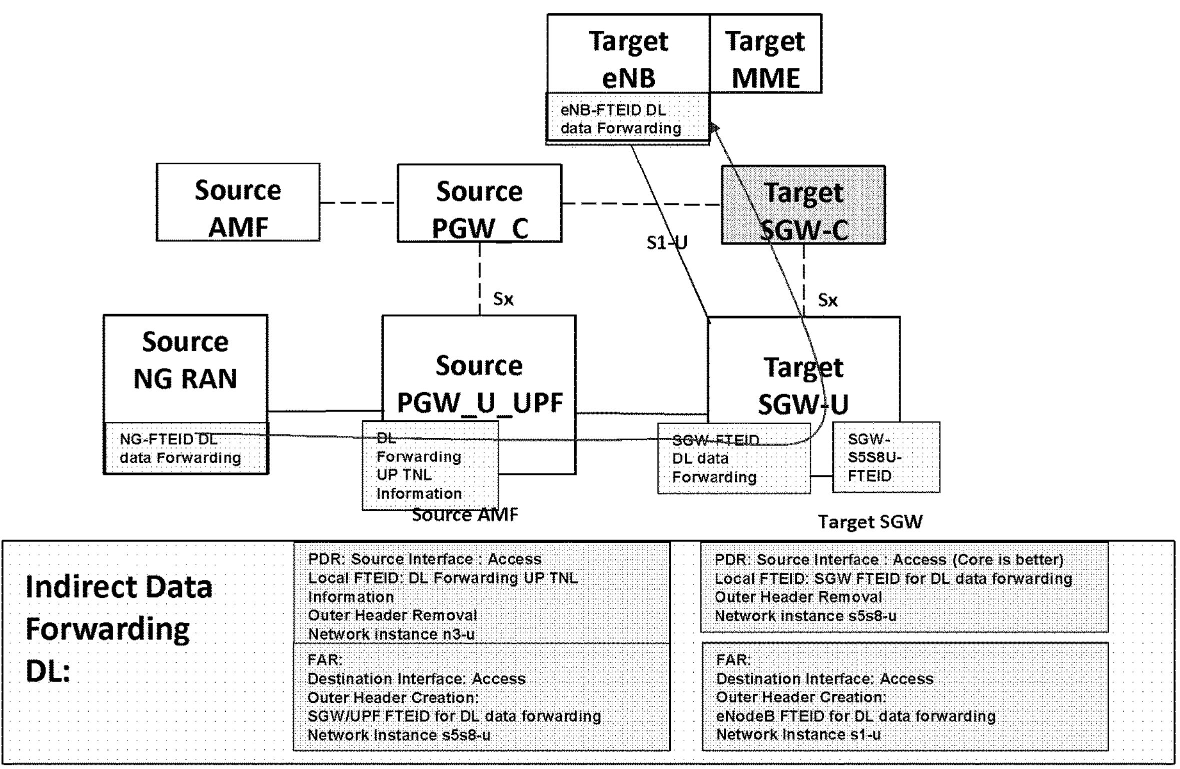
FIG. 11 schematically shows PFCP Interaction from 5GS to EPS handover for PDR/FAR according to an embodiment of the present disclosure.

As shown in FIG. 11, the target SGW-C may provide the target SGW-U with the following PDR and FAR:

PDR:

Source Interface: Access (Core is better)

Local FTEID: SGW FTEID for DL data forwarding

Outer Header Removal

Network instance s5s8-u

FAR:

Destination Interface: Access

Outer Header Creation:

eNodeB FTEID for DL data forwarding

Network Instance s1-u

Figure 12:
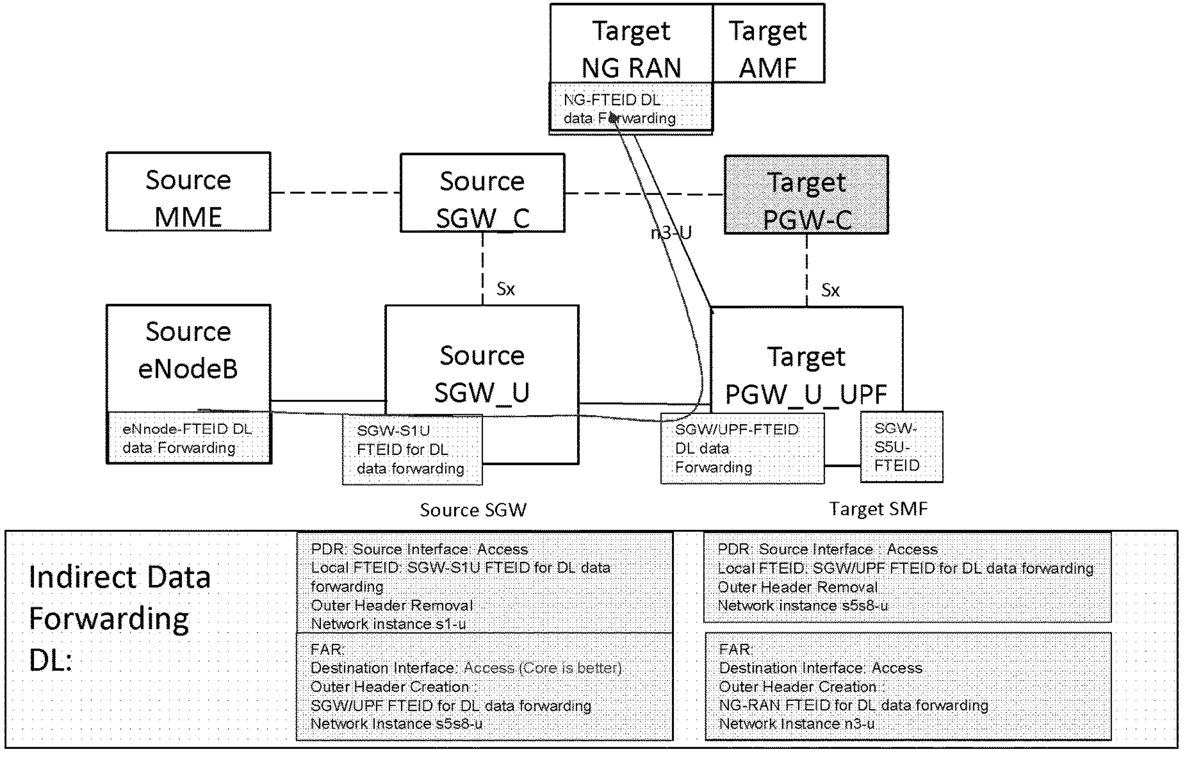
FIG. 12 schematically shows PFCP Interaction from EPS to 5GS handover for PDR/FAR according to an embodiment of the present disclosure.

As shown in FIG. 12, the source SGW-C may provide the source SGW-U with the following PDR and FAR:

PDR:

Source Interface: Access

Local FTEID: SGW-S1U FTEID for DL data forwarding

Outer Header Removal

Network instance s1-u

FAR:

Destination Interface: Access (Core is better)

Outer Header Creation:

SGW/UPF FTEID for DL data forwarding

Network Instance s5s8-u

At block 1006, the serving gateway entity may send, to the mobility management node, the response for the request.

According to various embodiments, the proposed solution enables Indirect Data Forwarding between 5GS and EPS handover procedure.

In an embodiment, the Indication Flag may be added in the Indirect Data Forwarding Tunnel Request to indicate SGW that current Indirect Data Forwarding for user plane routes is from UPF to SGW-U for 5GS to EPS interworking procedure or from SGW-U to UPF for EPS to 5GS handover procedure.

Table 7.2.18-1 of 3GPP TS 29.274 V16.3.0, the disclosure of which is incorporated by reference herein in its entirety, specifies Information Elements in a Create Indirect Data Forwarding Tunnel Request. In an embodiment, an additional flag may be added into Indication Flags such as:

Indication Flags (This IE shall be included if any one of the applicable flags is set to 1)

Indirect Forwarding with UPF Indication: this flag shall be set to 1 if indirect data forwarding is required for user plane routes from UPF in the 5GS to EPS handover procedure or to UPF in the EPS to 5GS handover procedure. This flag shall not be set to 1 if indirect data forwarding is used for other handover procedures.

FIG. 11 schematically shows PFCP Interaction from 5GS to EPS handover for PDR (Packet Detection Rule)/FAR (Forwarding Action Rule) according to an embodiment of the present disclosure. The arrowed line indicates the route of indirect data forwarding.

For indirect data forwarding, Source Interface and Destination Interface may be set to "Access", in the forwarding SGW(s). Either Source or Target side, Create indirect data forwarding will generate new PDR/FAR for payload forwarding in Sx interface, and this PDR/FAR will be removed when Delete indirect data forwarding happened.

As shown, the PDR in the source PGW_C_UPF may include:

Source Interface: Access

Local FTEID: DL Forwarding UP TNL Information

Outer Header Removal

Network instance n3-u

The FAR in the source PGW_C_UPF may include:

Destination Interface: Access

Outer Header Creation:

SGW/UPF FTEID for DL data forwarding

Network Instance s5s8-u

As shown, the PDR in the target SGW may include:

PDR: Source Interface: Access (Core is better)

Local FTEID: SGW FTEID for DL data forwarding

Outer Header Removal

Network instance s5s8-u

The FAR in the target SGW may include:

Destination Interface: Access

Outer Header Creation:

eNodeB FTEID for DL data forwarding

Network Instance s1-u

FIG. 12 schematically shows PFCP Interaction from EPS to 5GS handover for PDR/FAR according to an embodiment of the present disclosure. The arrowed line indicates the route of indirect data forwarding.

For indirect data forwarding, Source Interface and Destination Interface may be set to "Access", in the forwarding SGW(s). Either Source or Target side, Create indirect data forwarding will generate new PDR/FAR for payload forwarding in Sx interface, and this PDR/FAR will be removed when Delete indirect data forwarding happened.

As shown, the PDR in the source SGW may include:

Source Interface: Access

Local FTEID: SGW-S1U FTEID for DL data forwarding

Outer Header Removal

Network instance s1-u

The FAR in the source SGW may include:

Destination Interface: Access (Core is better)

Outer Header Creation:

SGW/UPF FTEID for DL data forwarding

Network Instance s5s8-u

As shown, the PDR in the target SMF may include:

Source Interface: Access

Local FTEID: SGW/UPF FTEID for DL data forwarding

Outer Header Removal

Network instance s5s8-u

The FAR in the target SMF may include:

Destination Interface: Access

Outer Header Creation:

NG-RAN FTEID for DL data forwarding

Network Instance n3-u

In an embodiment, the underlined content may be added to Table 7.2.18-1 of 3GPP TS 29.274 V16.3.0:

TABLE 7.2.18-1

| Information Elements in a Create Indirect Data Forwarding Tunnel Request | | | | |
|---|---|---|---|---|
| Information elements | P | Condition/Comment | IE Type | Ins. |
| IMSI | C | This IE shall be included by the MME/SGSN if the SGW that the MME/SGSN selects for indirect data forwarding is different from the SGW already in use for the UE as the anchor point except for the case:<br>If the UE is emergency attached and the UE is UICCless<br>When the IMSI is included in the message, it is not used as an identifier<br>if UE is emergency attached but IMSI is not authenticated.<br>See NOTE1. | IMSI | 0 |
| ME Identity (MEI) | C | This IE shall be included by the MME/SGSN if the SGW that the MME/SGSN selects for indirect data forwarding is different from the SGW already in use for the UE as the anchor point and if one of the following condition satisfies:<br>If the UE is emergency attached and the UE is UICCless<br>If the UE is emergency attached and the IMSI is not authenticated | MEI | 0 |
| Indication Flags | CO | This IE shall be included if any one of the applicable flags is set to 1.<br>Applicable flags are:<br>Unauthenticated IMSI: This flag shall be set to 1 if the IMSI present in the message is not authenticated and is for an emergency attached UE.<br>Indirect Forwarding with UPF Indication: This flag shall be set to 1 if indirect data forwarding is required for user plane routes from UPF in the 5GS to EPS handover procedure or to UPF in the EPS to 5GS handover procedure. This flag shall not be set to 1 if indirect data forwarding is used for other mobility procedures. | Indication | 0 |
| Sender F-TEID for Control Plane | C | This IE shall be included by the MME/SGSN if the SGW that the MME/SGSN selects for indirect data forwarding is different from the SGW already in use for the UE as the anchor point.<br>See NOTE1. | F-TEID | 0 |
| Bearer Contexts | M | Several IEs with this type and instance value may be included as necessary to represent a list of Bearers | Bearer Context | 0 |
| Recovery | CO | This IE shall be included if contacting the peer for the first time. | Recovery | 0 |
| Private Extension | O | | Private Extension | VS |

NOTE1: The SGW which is hosting the UE's bearer(s) is considered as the (local) anchor point. Unlike the PGW, the SGW may change due to mobility between eNodeBs, or E-UTRAN and GERAN/UTRAN supported with S4 based architecture. In these cases the new SGW where the UE's bearer(s) are moved, becomes the new local a nchor point. A source MME/SGSN may select an SGW for indirect data forwarding which is different than the source (anchor) SGW. Similarly, a target MME/SGSN may select an SGW for indirect data forwarding which is different than the target (anchor) SGW.

In an embodiment, Table 7.2.18-2 of 3GPP TS 29.274 V16.3.0 may be as following:

TABLE 7.2.18-2

| Bearer Context within Create Indirect Data Forwarding Tunnel Request | | | | |
|---|---|---|---|---|
| Octet 1 | | Bearer Context IE Type = 93 (decimal) | | |
| Octets 2 and 3 | | Length = n | | |
| Octet 4 | | Spare and Instance fields | | |
| Information elements | P | Condition/Comment | IE Type | Ins. |
| EPS Bearer ID | M | | EBI | 0 |
| eNodeB F-TEID for DL data forwarding | C | Target eNodeB F-TEID.<br>This IE shall be present in the message sent from the target MME to the SGW selected by the target MME for indirect data forwarding, or shall be included in the message sent from the source SGSN/MME to the SGW selected by the source MME for indirect data forwarding if the eNodeB F-TEID for DL data forwarding is included in the Forward Relocation Response message. | F-TEID | 0 |
| | CO | Target eNodeB F-TEID.<br>This IE shall be present in the message sent from the target MME to the SGW selected by the target MME for indirect data forwarding of the DL data buffered in the old SGW during a TAU with SGW change procedure and data forwarding, without Control Plane CIoT EPS optimisation, as specified in clause 5.3.3.1A of 3GPP TS 23.401 [3]. | | |

TABLE 7.2.18-2-continued

Bearer Context within Create Indirect Data Forwarding Tunnel Request

| Octet 1 | Bearer Context IE Type = 93 (decimal) |
|---|---|
| Octets 2 and 3 | Length = n |
| Octet 4 | Spare and Instance fields |

| Information elements | P | Condition/Comment | IE Type | Ins. |
|---|---|---|---|---|
| SGW/UPF F-TEID for DL data forwarding | C | Target SGW F-TEID<br>This IE shall be present in the message sent from the source MME/SGSN to the SGW selected by the source MME for indirect data forwarding if SGW F-TEID for DL data forwarding is included in the Forward Relocation Response message. This F-TEID is assigned by the SGW that the target MME/SGSN selects for indirect data forwarding. | F-TEID | 1 |
| | CO | Target UPF F-TEID<br>This IE shall be present in the message sent from the source MME to the SGW selected by the source MME for indirect data forwarding if SGW/UPF F-TEID for DL data forwarding is included in the Forward Relocation Response message. This IE contains the target V-UPF F-TEID in home routed roaming scenario, or contains the PGW-U + UPF F-TEID in non-roaming or local breakout scenario. | | |
| SGSN F-TEID for DL data forwarding | C | Target SGSN F-TEID<br>This IE shall be present in the message sent from the target SGSN to the SGW selected by the target SGSN for indirect data forwarding in E-UTRAN to GERAN/UTRAN inter RAT handover with SGW relocation procedure, or shall be included in the message sent from the source MME to the SGW selected by the source MME for indirect data forwarding if the SGSN F-TEID for DL data forwarding is included in the Forwarding Relocation Response message. | F-TEID | 2 |
| | CO | This IE shall also be present in the message sent from the source MME to the SGW selected by the source MME for indirect data forwarding if the SGSN Address for User Traffic and the Tunnel Endpoint Identifier Data II are included in the GTPv1 Forward Relocation Response message as specified in D.3.7 of 3GPP TS 23.401 [3]. .<br>This IE shall also be present, when Direct Tunnel is not used, in the message sent from the target SGSN to the SGW selected by the target SGSN for indirect data forwarding of the DL data buffered in the old SGW during a RAU with SGW change procedure and data forwarding, as specified in clause 5.3.3.1A of 3GPP TS 23.401 [3]. | | |
| RNC F-TEID for DL data forwarding | C | Target RNC F-TEID<br>This IE shall be present in the message sent from the target SGSN to the SGW selected by the target SGSN for indirect data forwarding in E-UTRAN to UTRAN inter RAT handover with SGW relocation procedure, or shall be included in the message sent from the source MME to the SGW selected by the source MME for indirect data forwarding if the RNC F-TEID for DL data forwarding is included in the Forwarding Relocation Response message. | F-TEID | 3 |
| | CO | This IE shall also be present in the message sent from the source MME to the SGW selected by the source MME for indirect data forwarding if the RNC IP address and TEID are included in the RAB Setup Information and/or the Additional RAB Setup Information in the GTPv1 Forwarding Relocation Response message as specified in D.3.3 of 3GPP TS 23.401 [3].<br>This IE shall be present, when Direct Tunnel is used, in the message sent from the target SGSN to the SGW selected by the target SGSN for indirect data forwarding of the DL data buffered in the old SGW during a RAU with SGW change procedure and data forwarding as specified in clause 5.3.3.1A of 3GPP TS 23.401 [3]. | | |
| eNodeB F-TEID for UL data forwarding | O | Target eNodeB F-TEID.<br>If available this IE may be present in the message, which is sent during the intra-EUTRAN HO from the target MME to the SGW selected by the target MME for indirect data forwarding, or may be included in the message sent from the source MME to the SGW selected by the source MME for indirect data forwarding if the eNodeB F-TEID for data UL forwarding is included in the Forward Relocation Response message. | F-TEID | 4 |
| SGW F-TEID for UL data forwarding | O | Target SGW F-TEID<br>If available this IE may be present in the message, which is sent during the intra-EUTRAN HO from the source MME to the SGW selected by the source MME for indirect data forwarding if SGW F-TEID for UL data forwarding is included in the Forward Relocation Response message. This F-TEID is assigned by the SGW that the target MME selects for indirect data forwarding. | F-TEID | 5 |

TABLE 7.2.18-2-continued

| Bearer Context within Create Indirect Data Forwarding Tunnel Request | | | | |
|---|---|---|---|---|
| Octet 1 | | Bearer Context IE Type = 93 (decimal) | | |
| Octets 2 and 3 | | Length = n | | |
| Octet 4 | | Spare and Instance fields | | |
| Information elements | P | Condition/Comment | IE Type | Ins. |
| MME F-TEID for DL data forwarding | CO | Target MME S11-U F-TEID This IE shall be present in the message sent from the target MME to the SGW selected by the target MME for indirect data forwarding, during a TAU procedure with SGW change and data forwarding, with Control Plane CIoT EPS optimisation, as specified in clause 5.3.3.1A of 3GPP TS 23.401 [3]. | F-TEID | 6 |

Figure 13A:
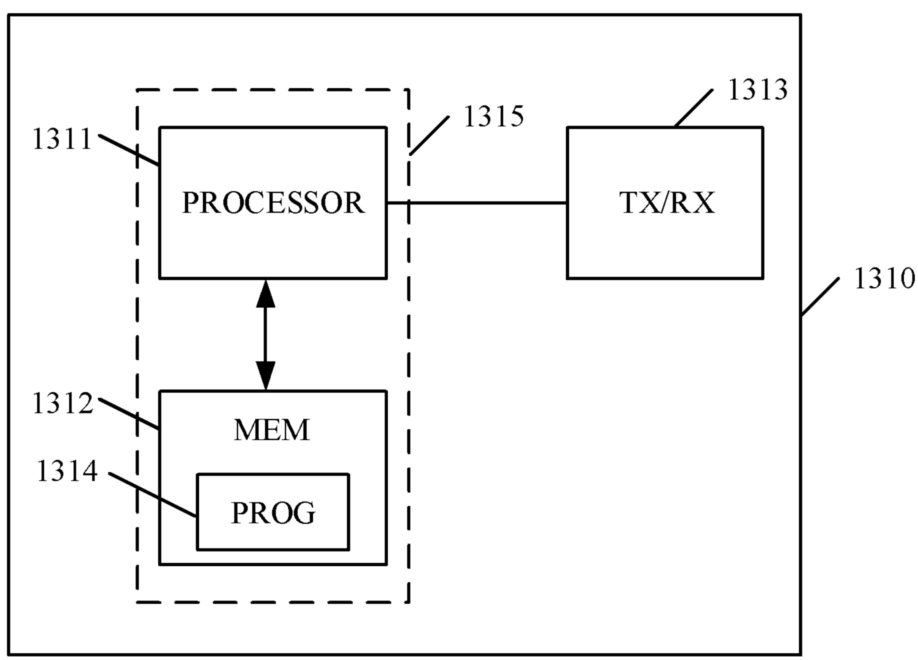
FIG. 13*a* illustrates a simplified block diagram of an apparatus that may be embodied in/as a mobility management node according to an embodiment of the present disclosure.
Figure 13B:
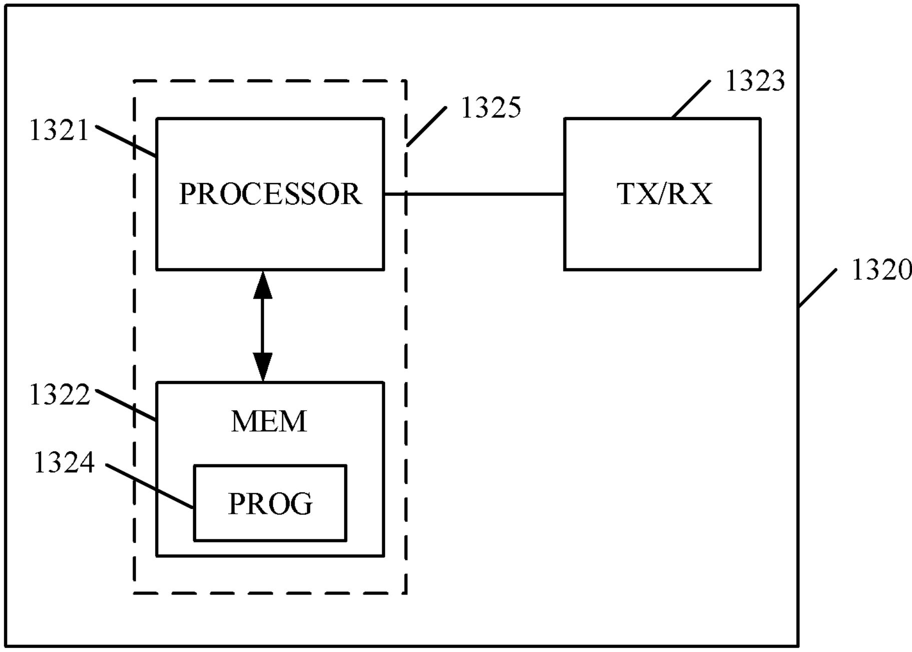
FIG. 13*b* illustrates a simplified block diagram of an apparatus that may be embodied in/as a serving gateway entity according to an embodiment of the present disclosure.

FIG. 13*a* illustrates a simplified block diagram of an apparatus 1310 that may be embodied in/as a mobility management node according to an embodiment of the present disclosure. FIG. 13*b* illustrates a simplified block diagram of an apparatus 1320 that may be embodied in/as a serving gateway entity according to an embodiment of the present disclosure.

The apparatus 1310 may comprise at least one processor 1311, such as a data processor (DP) and at least one memory (MEM) 1312 coupled to the processor 1311. The apparatus 1310 may further comprise a transmitter TX and receiver RX 1313 coupled to the processor 1311. The MEM 1312 stores a program (PROG) 1314. The PROG 1314 may include instructions that, when executed on the associated processor 1311, enable the apparatus 1310 to operate in accordance with the embodiments of the present disclosure, for example to perform the methods related to the user plane function node. A combination of the at least one processor 1311 and the at least one MEM 1312 may form processing means 1315 adapted to implement various embodiments of the present disclosure.

The apparatus 1320 comprises at least one processor 1321, such as a DP, and at least one MEM 1322 coupled to the processor 1321. The apparatus 1320 may further comprise a transmitter TX and receiver RX 1323 coupled to the processor 1321. The MEM 1322 stores a PROG 1324. The PROG 1324 may include instructions that, when executed on the associated processor 1321, enable the apparatus 1320 to operate in accordance with the embodiments of the present disclosure, for example to perform the methods related to the control plane function node. A combination of the at least one processor 1321 and the at least one MEM 1322 may form processing means 1325 adapted to implement various embodiments of the present disclosure.

Various embodiments of the present disclosure may be implemented by computer program executable by one or more of the processors 1311 and 1321, software, firmware, hardware or in a combination thereof.

The MEMS 1312 and 1322 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1311 and 1321 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the mobility management node, the memory 1321 contains instructions executable by the processor 1321, whereby the mobility management node operates according to the method 900 as described in reference to FIG. 9.

In an embodiment where the apparatus is implemented as or at the serving gateway entity, the memory 1322 contains instructions executable by the processor 1321, whereby the serving gateway entity operates according to the method 1000 as described in reference to FIG. 10.

Figure 14:
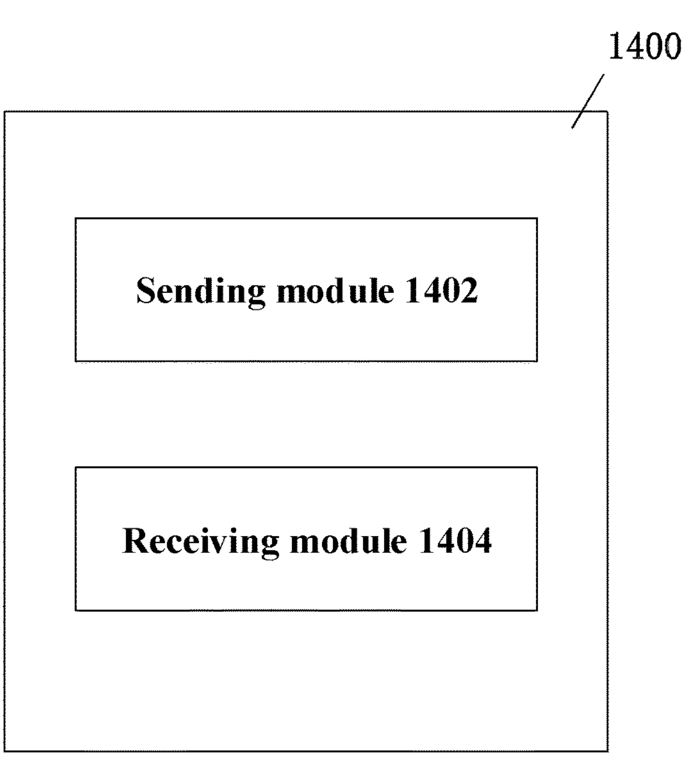
FIG. 14 is a block diagram showing a mobility management node according to an embodiment of the disclosure.

FIG. 14 is a block diagram showing a mobility management node according to an embodiment of the disclosure. As shown, the mobility management node 1400 comprises a sending module 1402 and a receiving module 1404. The sending module 1402 may be configured to send, to a serving gateway entity in the first system, a request for creating an indirect data forwarding tunnel. The request comprises an indication flag for indicating to the serving gateway entity that an indirect data forwarding tunnel is to be created with a user plane function entity in a second system. The receiving module 1404 may be configured to receive a response for the request from the serving gateway entity.

Figure 15:
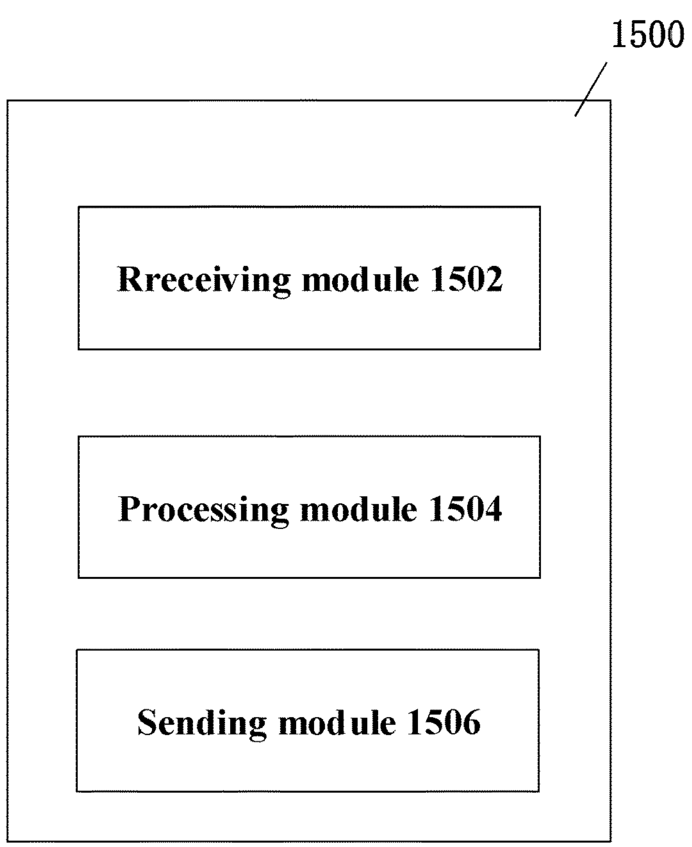
FIG. 15 is a block diagram showing a serving gateway entity according to an embodiment of the disclosure.

FIG. 15 is a block diagram showing a serving gateway entity according to an embodiment of the disclosure. As shown, the serving gateway entity 1500 comprises a receiving module 1502, a processing module 1504 and a sending module 1506. The receiving module 1502 may be configured to receive, from a mobility management node in the first system, a request for creating an indirect data forwarding tunnel. The request comprises an indication flag for indicating the serving gateway entity that the indirect data forwarding is related to a user plane function entity in a second system. The processing module 1504 may be configured to process the request to generate a response for the request. The sending module 1506 may be configured to send, to the mobility management node, the response for the request.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the mobility management node or the serving gateway entity may not need a fixed processor or memory. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out the method related to the mobility management node as described above.

According to an aspect of the disclosure it is provided a computer program product being tangibly stored on a computer readable storage medium and including instructions which, when executed on at least one processor, cause the at least one processor to carry out the method related to the serving gateway entity as described above.

According to an aspect of the disclosure it is provided a computer-readable storage medium storing instructions which when executed by at least one processor, cause the at least one processor to perform the method related to the mobility management node as described above.

According to an aspect of the disclosure it is provided a computer-readable storage medium storing instructions which when executed by at least one processor, cause the at least one processor to perform the method related to the serving gateway entity as described above.

Embodiments herein afford many advantages, of which a non-exhaustive list of examples follows. In some embodiments herein, when the indirect data forwarding applies in the inter system handover procedure such as 5GS to EPS handover procedure or EPS to 5GS handover procedure, it can correctly work. It's possible for downlink data to deliver to eNodeB for 5GS to EPS handover or to NG-RAN for EPS to 5GS handover when Indirect Data Forwarding procedure is applied. The embodiments herein are not limited to the features and advantages mentioned above. A person skilled in the art will recognize additional features and advantages upon reading the following detailed description.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a mobility management node in a first system, the method comprising:

sending, to a serving gateway entity in the first system, a request for creating an indirect data forwarding tunnel, wherein the request comprises an indication flag indicating to the serving gateway entity that an indirect data forwarding tunnel is to be created with a user plane function entity in a second system; and receiving a response to the request from the serving gateway entity, wherein:

the indication flag is present and set to 1, when the indirect data forwarding tunnel is required for at least one user plane route to or from the user plane function entity in the second system during an inter system handover via an N26 interface;

the indication flag is absent or is present and not set to 1, when the indirect data forwarding tunnel is required for a mobility procedure other than the inter system handover via the N26 interface;

the inter system handover is from the first system to the second system or from the second system to the first system; and the first system is an evolved packet system (EPS) and the second system is a fifth generation system (5GS).

2. The method according to claim 1, wherein the request is sent during the inter system handover.

3. The method according to claim 2, wherein the N26 interface is between an access and mobility management function (AMF) in the 5GS and a mobility management entity (MME) in the EPS.

4. The method according to claim 3, wherein the indirect data forwarding tunnel is for one of the following:

indirect data forwarding from the user plane function entity in the second system to a user plane of the serving gateway entity in the first system, when the inter-system handover is from the 5GS to the EPS; or indirect data forwarding from the user plane of the serving gateway entity in the first system to the user plane function entity in the second system, when the inter-system handover is from the EPS to the 5GS.

5. The method according to claim 1, wherein one or more of the following applies:

the request is a Create Indirect Data Forwarding Tunnel Request and the response is a Create Indirect Data Forwarding Tunnel Response;

the mobility management node is a mobility management entity (MME);

the serving gateway entity is a serving gateway (SGW) or an SGW control plane (SGW-C); and the user plane function entity is a User plane Function (UPF).

6. A method performed by a serving gateway entity in a first system, comprising:

receiving, from a mobility management node in the first system, a request for creating an indirect data forwarding tunnel, wherein the request comprises an indication flag indicating to the serving gateway entity that an indirect data forwarding tunnel is to be created with a user plane function entity in a second system;

processing the request to generate a response for the request; and sending, to the mobility management node, the response generated for the request, wherein:

the indication flag is present and set to 1, when the indirect data forwarding tunnel is required for at least one user plane route to or from the user plane function entity in the second system during an inter system handover via an N26 interface;

the indication flag is absent or is present and not set to 1, when the indirect data forwarding tunnel is required for a mobility procedure other than the inter system handover via the N26 interface;

the inter system handover is from the first system to the second system or from the second system to the first system; and the first system is an evolved packet system (EPS) and the second system is a fifth generation system (5GS).

7. The method according to claim 6, wherein the request is received during the inter system handover.

8. The method according to claim 7, wherein the N26 interface between an access and mobility management function (AMF) in the 5GS and a mobility management entity (MME) in the EPS.

9. The method according to claim 8, wherein the indirect data forwarding tunnel is for one of the following:

indirect data forwarding from the user plane function entity in the second system to a user plane of the serving gateway entity in the first system, when the inter-system handover is from the 5GS to the EPS; or indirect data forwarding from the user plane of the serving gateway entity in the first system to the user plane function entity in the second system, when the inter-system handover is from the EPS to the 5GS.

10. The method according to claim 6, wherein one or more of the following applies:

the request is a Create Indirect Data Forwarding Tunnel Request and the response is a Create Indirect Data Forwarding Tunnel Response;

the mobility management node is a mobility management entity (MME);

the serving gateway entity is a serving gateway (SGW) or an SGW control plane (SGW-C); and the user plane function entity is a User plane Function (UPF).

11. A mobility management node in a first system, the mobility management node comprising:

a processor; and a memory operably coupled to the processor and containing instructions executable by said processor, whereby said mobility management node is operative to:

send, to a serving gateway entity in the first system, a request for creating an indirect data forwarding tunnel, where the request comprises an indication flag indicating to the serving gateway entity that an indirect data forwarding tunnel is to be created with a user plane function entity in a second system; and receive a response to the request from the serving gateway entity, wherein:

the indication flag is present and set to 1, when the indirect data forwarding tunnel is required for at least one user plane route to or from the user plane function entity in the second system during an inter system handover via an N26 interface;

the indication flag is absent or is present and not set to 1, when the indirect data forwarding tunnel is required for a mobility procedure other than the inter system handover via the N26 interface;

the inter system handover is from the first system to the second system or from the second system to the first system; and the first system is an evolved packet system (EPS) and the second system is a fifth generation system (5GS).

12. A serving gateway entity in a first system, the serving gateway entity comprising:

a processor; and a memory operably coupled to the processor and containing instructions executable by said processor, whereby said mobility management node is operative to perform operations corresponding to the method of claim 6.

* * * * *